United States Patent [19]
Nobuchi et al.

[11] Patent Number: 6,034,866
[45] Date of Patent: Mar. 7, 2000

[54] EQUIPMENT HAVING OPENABLE COVER

[75] Inventors: Atsunobu Nobuchi; Hideaki Kamikakoi; Katsuichi Goto, all of Kawasaki; Kazuo Kawasaki, Nagoya, all of Japan

[73] Assignee: Fujitsu Limited, Kawasaki, Japan

[21] Appl. No.: 08/961,151

[22] Filed: Oct. 30, 1997

[30] Foreign Application Priority Data

Feb. 26, 1997 [JP] Japan .................................. 9-042367

[51] Int. Cl.[7] ........................................................ G06F 1/16
[52] U.S. Cl. ...................... 361/681; 361/727; 248/298.1; 248/918; 345/169; 345/905
[58] Field of Search ................................. 361/681, 680, 361/727; 312/223.1, 223.2, 712; 364/7.2, 708.1; D18/6, 8, 11; D14/113, 102, 107; 248/917–924, 298.1, 286.1, 918; 345/169, 905, 168, 173; 349/58; 235/383, 385, 472.01

[56] References Cited

FOREIGN PATENT DOCUMENTS

| | | |
|---|---|---|
| 60-143997 | 7/1985 | Japan . |
| 2-309414 | 12/1990 | Japan . |
| 3-44725 | 2/1991 | Japan . |
| 8-16522 | 1/1996 | Japan . |

*Primary Examiner*—Leo P. Picard
*Assistant Examiner*—Lisa Lea-Edmonds
*Attorney, Agent, or Firm*—Staas & Halsey LLP

[57] ABSTRACT

An electronic equipment has a body with a cover which is easily openable and closable and which body can be maintained at a tilted state by the opened cover, enhancing use of the equipment. The equipment includes a body having a display panel and first and second cover members, mounted to the body and guided in a slidable and pivotable manner between first (closed) and second (opened) positions. The second cover member is pivotably coupled at one end to the first cover member, the first and second cover members cooperating with each other to cover the display panel in respective first and third positions thereof. In respective second and fourth positions thereof, the second cover member is rotated about an end of the body and extends below a rear surface of the body to maintain the body in a tilted state.

23 Claims, 5 Drawing Sheets

EQUIPMENT HAVING OPENABLE COVER

BACKGROUND OF THE INVENTION

1. Field of the Invention

The present invention relates to an equipment having an openable cover. Particularly, the present invention relates to a small sized portable equipment such as a portable calculator, a personal computer, a word processor or an electronic notebook, having a cover for opening and closing an operating panel or a display panel.

Most of the portable equipment of such a type are provided with a protective cover which is opened when the equipment is used so that an operating panel or a display panel formed of a liquid crystal is exposed to be manipulated by a finger or a pen, and is closed when the equipment is not used to protect the operating panel or the display panel. Also, it is necessary to protect the liquid crystal panel from breakage when the equipment is not used and is being carried by a user while it is necessary to be able to easily manipulate the liquid crystal panel by a finger or a pen when the equipment is being used.

2. Description of the Related Art

Figure 5A:
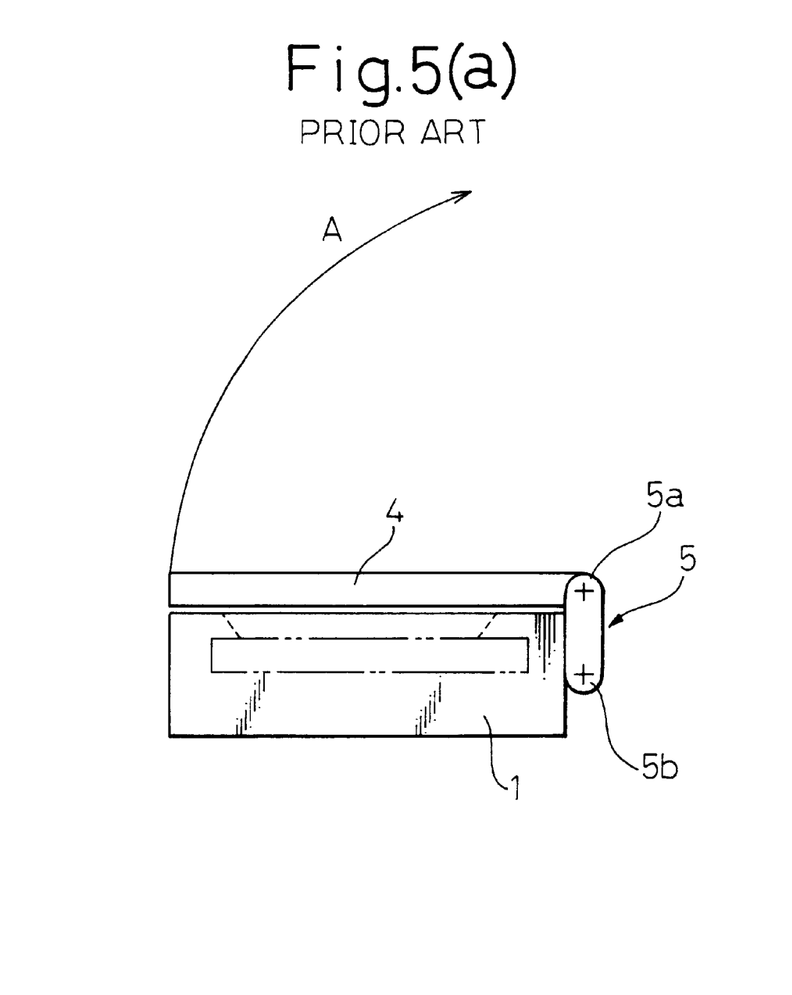
FIGS. 5(a) and 5(b) are diagrammatic side views of a prior art electronic equipment having an openable cover, illustrating the closed state and the opened state, respectively.
Figure 5B:
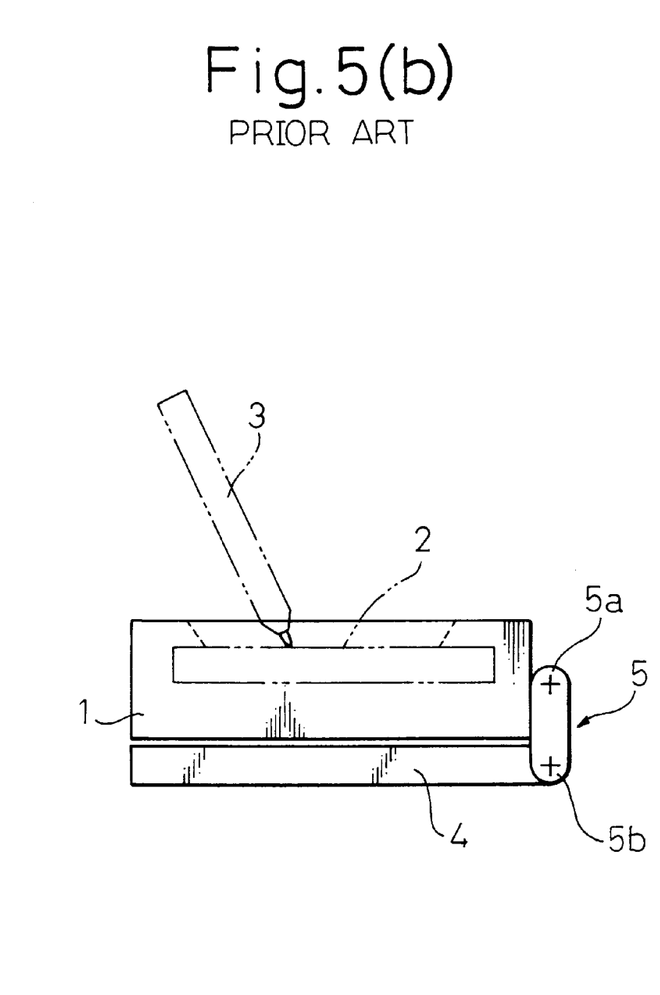

A prior art portable terminal equipment of a pen touch type having a protective cover is shown in FIGS. 5(a) and 5(b). In these drawings, reference numeral 1 denotes an equipment body; 2 a liquid crystal display panel disposed on a top surface of the equipment body, which is also used as a press(or touch)-input section; 3 a pen for inputting information to the liquid crystal display panel; 4 a protective cover for opening and closing the liquid crystal display panel; and 5 a hinge member having two pivots 5a, 5b.

As illustrated, the protective cover 4 is coupled to the equipment body 1 by the hinge member 5 having the two pivots 5a, 5b. More specifically, the hinge member 5 is coupled to a rear edge of the protective cover 4 by one pivot 5a and to a center of a rear wall of the equipment body 1 (as seen in the vertical direction) by the other pivot 5b.

As shown in FIG. 5(a), when the equipment is not being used, the protective cover 4 is brought into contact with the top surface of the equipment body 1 to completely cover the liquid crystal display panel 2. When the equipment is being used, the protective cover 4 is opened as shown in FIG. 5(b) by rotating in the arrowed direction A, which causes the hinge member 5 to rotate about the pivots 5a, 5b by about 180° each (a total of 360°) at the maximum so that the protective cover 4 is brought into contact with a bottom surface of the equipment body 1. In this opened state, the liquid crystal display panel 2 is operable by the pen 3.

Japanese Unexamined Patent Publication (Kokai) No. 8-16522 discloses another prior art electronic equipment having a body and a cover capable of selectively occupying a first position for covering an operating surface of the equipment body or a second position for covering a rear surface opposite to the operating surface, wherein the equipment body is tiltable to the second position by raising a stand from the cover.

According to the prior art portable terminal equipment of a pen touch type having a protective cover shown in FIGS. 5(a) and 5(b), the protective cover 4 is opened until it is brought into contact with the rear surface of the equipment body when being used, as shown in FIG. 5(b). If the terminal equipment is placed on a desk (not shown) as it is, the liquid crystal display panel is in the horizontal position, which makes it difficult for the user to carry out the pen touch input operation while watching the liquid crystal display panel, because it requires the user to face the liquid crystal display panel from directly above.

On the other hand, the electronic equipment disclosed in Japanese Kokai No. 8-16522 is advantageous in that it is capable of selectively occupying a tilted position when the cover is in the second position, that is, when the cover is opened to be ready to use, by raising the stand from the cover. However, there is a problem in that it is necessary to raise the stand every time the equipment body is brought into a tilted position and to restore the stand every time the cover is closed.

SUMMARY OF THE INVENTION

An object of the present invention is to provide an equipment having a protective cover which is easily opened and closed and capable of maintaining an equipment body at a tilted position, ready to use, when the cover is opened.

To achieve the above object, according to the present invention, an equipment having an openable cover is provided, which comprises an equipment body having a display panel, a first cover member mounted to the equipment body to be guided in a slidable manner between a first position and a second position, and a second cover member pivotably coupled at one end to the first cover member, wherein the first and second cover members cooperate with each other to cover the display panel at the first position, and the other end of the second cover member moves to a position on the rear surface side of the equipment body to maintain the equipment body in a tilted state at the second position.

Thus, the first and second cover members are coplanar at the closed position and cover the display panel, and maintain a predetermined angle therebetween at the open position so that the other end of the second cover member moves to a position on the rear surface side of the equipment body to maintain the equipment body in a tilted state.

A pair of first guides extend between the first and second positions in parallel to the display panel along a length thereof in the closing/opening direction of the cover, and a pair of second guides shorter than the first guides and extending in parallel thereto, are provided on respective, opposite sides of the equipment body; the first cover member has one end and the other end pivotably coupled to one end of the second cover member so that the one end of the first cover member is slidably and pivotably guided by the first guide between the first and second positions; the second cover member has pivots, in addition to the abovesaid one end pivotably coupled to the other end of the first cover member and the abovesaid other end; the pivots are slidably guided from first position to the second position of the second guide and pivotably guided at the second position; when the one end of the first cover member is at the first position of the first guide and the pivots of the second cover member are at the first position of the second guide, the first and second cover members occupy a closed position at which they cooperate with each other to cover the display panel; the first and second cover members move from the closed position in parallel to each other along the first and second guides until the pivots of the second cover member reach the second position of the second guide; and thereafter, the one end of the first cover member is pivotably slid along the first guide and the pivots of the second cover member are pivoted at the second position of the second guide to move the other end of the second cover member to a position on the rear surface side of the equipment body when the one end of the first cover member reaches the second position of the second guide and thus maintain the equipment body in a tilted state.

According to the above structure, at the initial step for opening the protective cover, including the first and second cover members, both of the first and second cover members are engaged in (i.e., undergo) a parallel movement in the opening direction and, at the next step, the first cover member, solely, further slides mainly in the opening direction, while, the second cover member pivots to move the other end thereof to a position on the rear surface side of the equipment body so that the equipment body is maintained at a tilted position. When the protective cover is closed, the steps reverse thereto are carried out.

The pair of first guides includes a pair of guide grooves provided on respective, opposite sides of the equipment body, with which are slidably and pivotably engaged by a pair of pins provided at one end of the first cover member. Each of the pair of guide grooves is arranged so that the open side thereof is reverse to the other, and each of the pair of pins is projected toward the other to be engageable with each of the pair of guide grooves.

This allows both sliding and pivoting movements of the first cover member while preventing the pair of pins from disengaging from the pair of guide grooves.

The pair of second guides includes a pair of guide paths provided on respective opposite sides of the equipment body and a pair of guide bars nested in the pair of guide holes to be slidable therealong, wherein the pair of pivots in the second cover member are pivotably coupled to free ends of the pair of guide bars.

According to this structure, at the initial step for opening the protective cover consisting of the first and second cover members, only the second cover member is allowed to slide, while the first cover member moves concomitantly therewith.

The pair of guide paths and the pair of guide bars have a rectangular cross-section to prevent the guide bar from rotating in the guide path.

The pair of pivots in the second cover member includes a pair of pins projected inwardly opposite to each other, and pivotably engageable with a pair of pivot holes provided at free ends of the pair of guide bars. On the opposite sides of the equipment body, a pair of second guide grooves are provided in parallel to the pair of guide grooves and also are engaged with the pair of pivots.

Thereby, it is possible to cause the pair of pivots in the second cover member to slide from the first position to the second position thereof without disengaging from the pair of second guide grooves.

The other end of the first cover member is pivotably coupled to the one end of the second cover member by a hinge member disposed so that a pivot axis of the hinge member is parallel to the pair of pins at the one end of the first cover member and the pair of pins in the pivots of the second cover member. The hinge member is preferably made of a flexible film.

Thereby, the hinge between the first and second cover member becomes simple in structure to enable the smooth pivot action during the opening/closing operation of the protective cover.

The second cover member includes a stop means to be in contact with the rear surface of the equipment body at the open position of the protective cover including the first and second cover members. Thereby, it is possible to maintain the equipment body in a stably tilted state when being used with the protective cover open.

DETAILED DESCRIPTION OF THE EMBODIMENTS

The present invention will be described in detail below with reference to FIGS. 1(a) to 4 illustrating the preferred embodiment.

The present invention is applicable to a small sized portable equipment such as a portable calculator, a personal computer, a word processor or an electronic note book, having a cover for opening and closing an operating panel or a display panel (hereinafter referred to as a display panel).

Figures 1A, 1B:
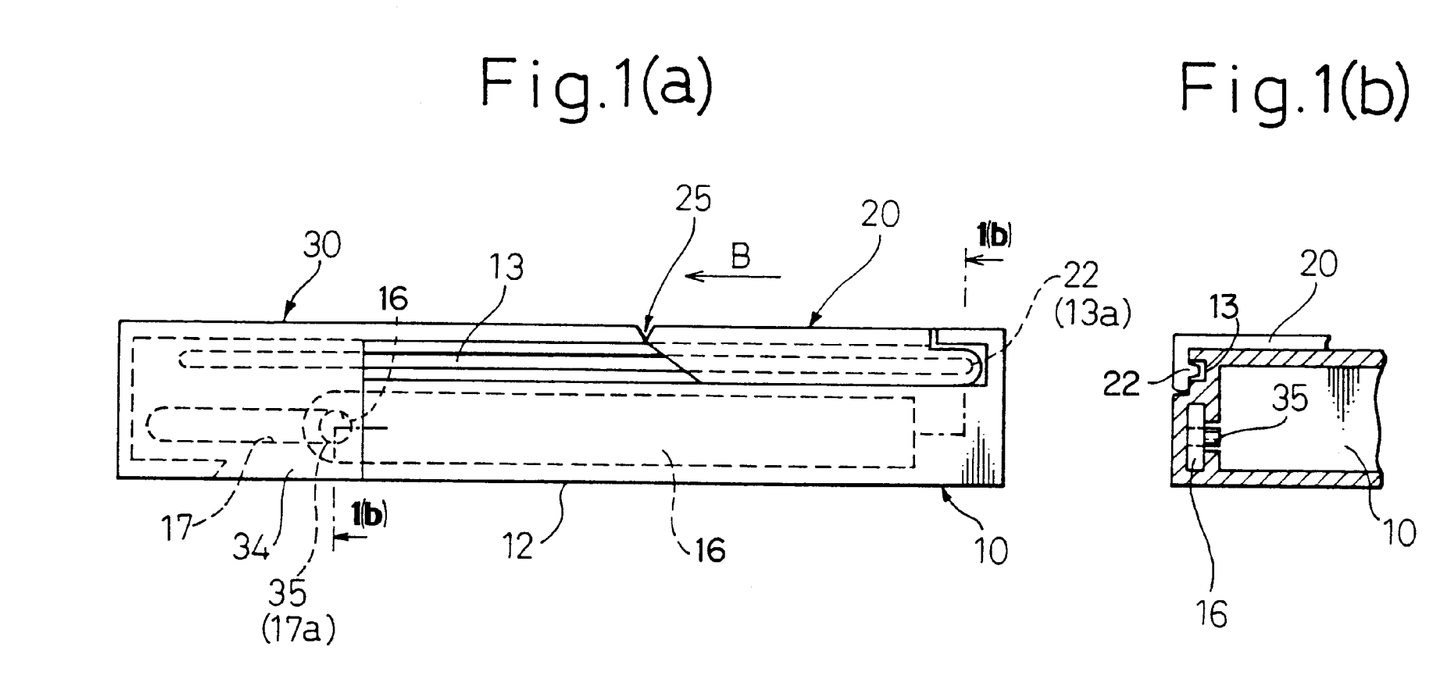
FIGS. 1(a) and 1(b) are a side view and a sectional view taken along line 1(b)–1(b) of FIG. 1(a), respectively, of one embodiment of an equipment having an openable cover according to the present invention, illustrating a closed state of the cover.

As shown in FIGS. 1(a) and 1(b), an equipment body 10 has a horizontal liquid display panel 11 and a rear surface 12 to be in contact with a desk top 40, both of which are parallel to the desk top 40 when such an equipment is placed thereon while a protective cover thereof is closed.

Figure 2:
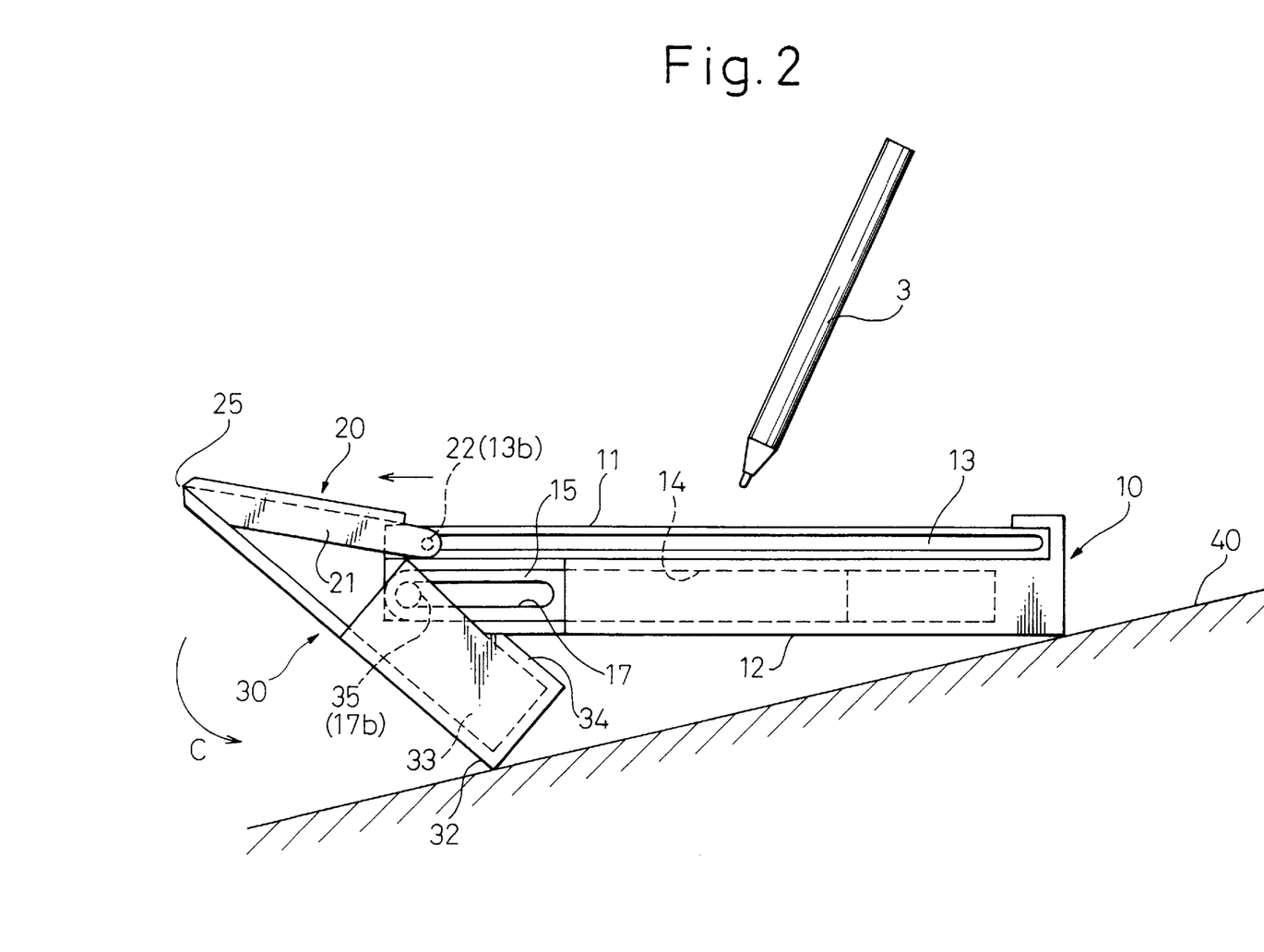
FIG. 2 is a side view of the embodiment of FIGS. 1(a) and 1(b) illustrating an opened state of the cover.
Figure 3:
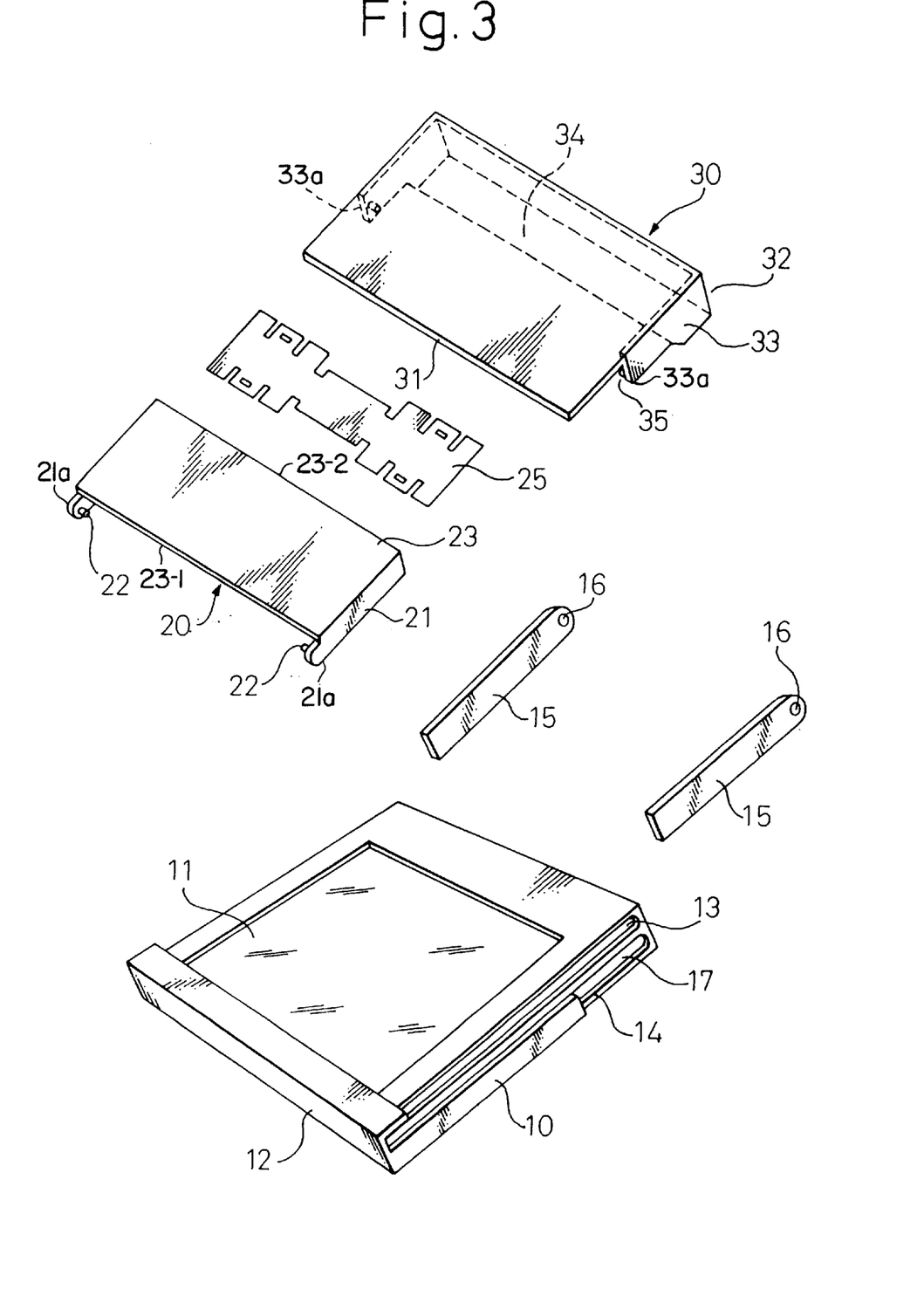
FIG. 3 is an exploded perspective view of the embodiment of FIGS. 1(a) and 1(b)
Figure 4:
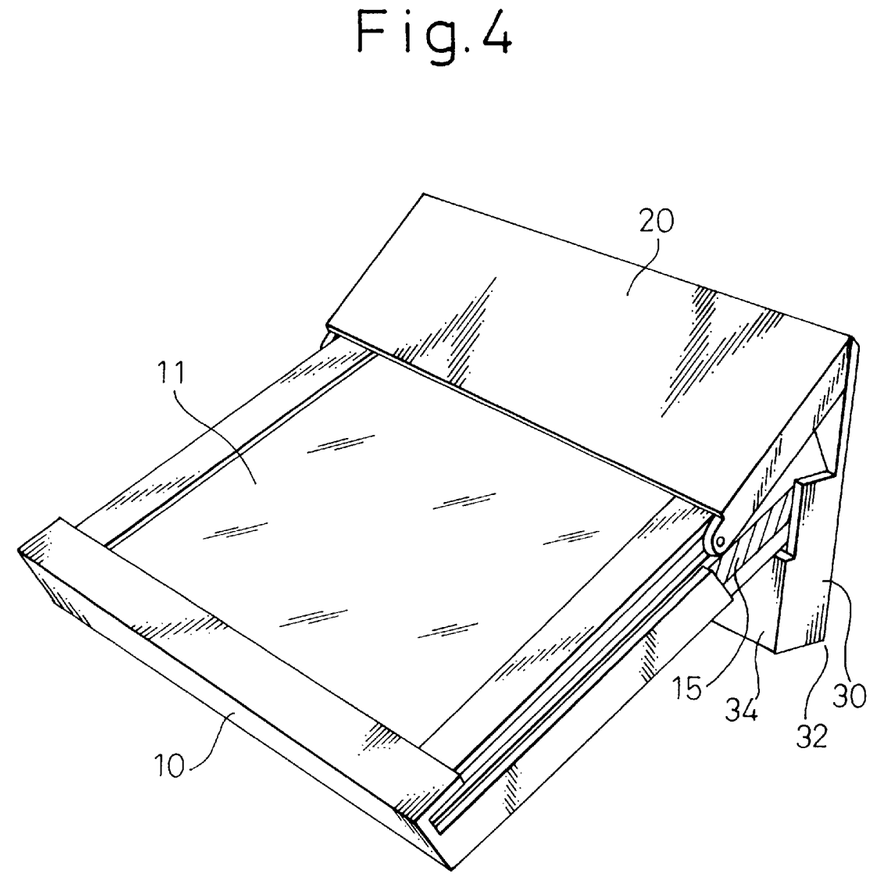
FIG. 4 is a perspective view of the embodiment of FIGS. 1(a) and 1(b); illustrating the opened state of the cover.

With reference to FIGS. 2 to 4, in the opposite side walls of the equipment body 10, a pair of guide grooves 13, 13 extend in parallel to the display panel 11 in the opening and closing direction of the protective cover for the display panel 11, which have a length approximately equal to that of the display panel 11 and are moveable relatively to the body 10 from a closed state covering the display panel 11 to an opened state exposing the display panel 11.

In the lower area of the respective side walls of the equipment body 10 beneath the guide grooves 13, a pair of guide paths 14 having a rectangular cross-section are provided in parallel to the guide grooves 13. A pair of guide bars 15, 15 having a rectangular cross-section are nested in a slidable manner into the guide paths 14, 14, respectively. Since the guide paths 14, 14 and the guide bars 15, 15 have a rectangular cross-section, the guide bars 15, 15 are slidable along the guide paths 14, 14 but are inhibited from rotating on the axis thereof. At a free end of the guide bar 15, projecting out from the guide path 14, a pivot hole 16 is provided.

The protective cover for opening and closing the liquid crystal display panel 11 of the equipment body 10 includes two cover members; a first cover member 20 and a second cover member 30. The first cover member 20 has, on the opposite side thereof, a pair of downward lateral walls 21, 21 having a relatively small height having respective extentions 21a at a first end 23-1 and carrying a corresponding pair of pins 22, 22 projecting inwardly from the respective extensions 21a in opposed relationship; end thereof to be opposite to each other and defining a first common axis of rotation.

The first cover member 20 is coupled at another end 23-2 thereof to a first end 31 of the second cover member 30 via a hinge member 25, such as a flexible sheet made of film or a metallic hinge, so that the first cover member 20 is pivotable relatively to the second cover member 30.

The second cover member 30 has, extending from a second end 32 thereof, a pair of downward lateral walls 33, 33 extending from opposite edges of a wall section 34, forming a part of the bottom wall of the equipment when the protective cover is closed (see FIGS. 1(a) and 1(b)) and defining a box-shape at the second end 32 of the second cover member 30 and extending to a central position along the edges of the wall section 34. A pair of pivots 35, 35 projected inwardly inopposed relationship to each other, from the walls 33, 33 adjacent their open ends, at positions generally in a central location of the second cover member 30 between the first and second ends 31 and 32, but somewhat closer to the first end 31, adjacent the interior edges 33a, 33a of the lateral walls 33, 33. The pivots 35, 35 define a second common axis of rotation, of the second cover member 30, parallel to the first axis of rotation.

The pair of pins 22, 22 of the first cover member 20 are slidably and pivotably engaged with the pair of guide grooves 13, 13 in the equipment body 10 while the pair of pivots 35, 35 of the second cover member 30 are pivotably engaged with a pair of pivot holes 16, 16 provided at free ends of the guide bars 15, 15, and slidably engaged with the pair of guide grooves 17, 17 formed in the opposite lateral walls of the equipment body 10, parallel to the pair of guide grooves 13, 13. The guide grooves 17, 17 are considerably shorter in axial length than the guide grooves 13, 13.

FIG. 1 illustrates a state wherein the protective cover, including the first cover member 20 and the second cover member 30, are closed to cover and protect the display panel 11 of the equipment body 10. That is, the first cover member 20 and the second cover member 30 are positioned generally coplanar with each other to be extended at 180° on the display panel 11, with the hinge member 25 interposed between the two. In this state, the pins 22, 22 of the first cover member 20 occupy a first position (13a) in the guide grooves 13, 13, and the guide bars 15, 15 are inserted into the guide paths 14, 14 while the pivots 35, 35 occupy a first position (17a).

If the first cover member 20 or the second cover member 30 is pushed in the opening direction (shown by arrow B in FIG. 1) from the closed position, the guide bars 15, 15 are allowed to slide along the guide paths 14, 14 while being inhibited from pivoting. Thus, the pins 22, 22 of the first cover member 20 slide together therewith along the guide grooves 13, 13 and the pivots 35, 35 of the second cover member 30 slide along the guide grooves 17, 17, whereby the first cover member 20 and the second cover member 30 are engaged in the parallel movement. Since the wall section 34 closer to the second end 32 of the second cover member 30 is brought into contact with the bottom surface of the equipment body 10, the parallel movement of the two cover members 20 and 30 is further enhanced.

When the pivots 35, 35 of the second cover member 30 reach a second position (17b) at the other end of the guide grooves 17, 17, the guide bars 15, 15 cannot be slid further. At this position, the wall section 34 of the second cover member 30 is away from the bottom surface of the equipment body 10. Thereafter, the second cover member 30 rotates in the opening direction (shown by an arrow C in FIG. 2), and the pins 22, 22 of the first cover member 20 are made to slightly rotate while further sliding along the guide grooves 13, 13 with the movement of the second cover member 30.

When the pins 22, 22 of the first cover member 20 reach a second position (13b) at the other end of the guide grooves 13, 13, the first cover member 20 becomes immobile, and the display panel 11 of the equipment body 10 is maintained in a fully opened state. Also, the other end 32 of the second cover member 30 moves to a position approaching a contact with the rear surface 12 of the equipment body 10 to maintain the equipment body 10 in a tilted state.

In this open state, the wall section 34 provided at the second end 32 of the second cover member 30 is brought into contact with the rear surface 12 of the equipment body 10 and operates as a stop for stably maintaining the equipment body 10 in the tilted state.

While described in detail above based on the preferred embodiment of with reference to the attached drawings, it should be noted that the present invention is not limited thereto, but may include various changes and modifications without departing from the spirit and scope of the present invention.

As stated above, according to the present invention, the protective cover including the first and second cover members are easily openable and closable by a simple operation for pushing the cover member in the horizontal direction. Also, since the equipment body is maintained in a suitably tilted state when the protective cover is fully opened, pen touch input can be easily carried out.

We claim:

1. An equipment having an openable cover, comprising:
   a body having a display panel;
   a first cover member mounted on the body and guidable in a slidable and pivotable manner between a first position and a second position relatively to the body;
   a second cover member mounted on the body and guidable in a slidable and pivotable manner between a third position and a fourth position relatively to the body, the second cover member being pivotably coupled at an interior end thereof to an adjacent, interior end of the first cover member; and
   the first and second cover members in the respective first and third positions thereof being in a substantially coplanar relationship, parallel to the display panel and cooperating with each other to cover the display panel, and the second cover member moving to the fourth position thereof, adjacent an end of the body and being pivoted about the end of the body so as to project an exterior end thereof below the rear surface of the body and maintain the body in a tilted state at the second pivoted position of the second cover member, the first and second cover members concurrently pivoting relatively to each other at their pivotally coupled interior ends and the first cover member moving to the second position thereof with an exterior end thereof adjacent the end of the body and pivoted relatively to the body about the end thereof, so as to expose the display panel in the tilted state of the body.

2. The equipment claimed in claim 1, wherein the interior end of the first cover member is pivotably coupled to the interior end of the second cover member by a hinge member.

3. The equipment claimed in claim 2, wherein the hinge member is a flexible sheet.

4. The equipment claimed in claim 1, wherein the second cover member further comprises a stop element contacting the rear surface of the body in the open position of the first and second cover members to establish and maintain the tilted state of the body.

5. An equipment having an openable cover, comprising:
   a body having upper and lower main surfaces with corresponding side edges and front and rear edges interconnected by respective side walls and front and rear end walls, the upper main surface having a display panel thereon;

a pair of first guides in the pair of side walls, respectively, extending by a first distance between first and second end positions respectively adjacent the front and rear end walls, parallel to the display and to each other;

a pair of second guides in the pair of side walls, respectively, parallel to the pair of first guides and extending by a second distance, less than the first distance, between third and fourth end positions, the third end positions being intermediate the first distance and the fourth end positions being adjacent the rear wall;

a first cover member having first and second ends and a second cover member having third and fourth ends, the second and third ends being pivotally coupled, opposite sides of the first cover at the first end thereof being slidably and pivotally received in and guided by the first pair of guides, respectively, for movement between the respective first and second end positions thereof, and opposite sides of the second cover member at intermediate positions between the third and fourth ends thereof being slidably and pivotally received in and guided by the second pair of guides, respectively, for movement between the respective third and fourth end positions thereof;

the first and second cover members lying in a common plane parallel to, and covering, the display when pivotally coupled to the respective first and second pairs of guides in the respective first and third end positions thereof, and the first and second covers being slidably movable in the respective first and second guides from the first and third, and toward the second and fourth, respective end positions thereof, the second cover member further being rotatable, when coupled to the second guides at the respective fourth end positions thereof, about the rear end wall of the body so as to extend at an angle relatively to the upper and lower main surfaces of the body and below the bottom main surface of the body, thereby to support the body at a tilted state.

6. An equipment claimed in claim 5, wherein the pair of first guides comprises a pair of guide grooves in the respective side walls of the body, with which are slidably and pivotally engaged a pair of first pins provided at opposite sides of the first end of the first cover member.

7. The equipment claimed in claim 6, wherein the first cover member further comprises:

a pair of side walls depending downwardly from the opposite side edges thereof, the pair of first pins extending in common axial and opposed, inward relationship from the respective pair of side walls.

8. The equipment as defined by claim 5, wherein:

the second cover member further comprises an end wall depending from the fourth end of the second cover member and a pair of side walls depending downwardly from the opposite sides, respectively, of the second cover member and extending from the fourth end of the second cover member to an intermediate position along the respective sides thereof, a pair of second pivots extending in common axial and opposed, inward relationship from the respective pair of side walls adjacent the intermediate position thereof.

9. The equipment claimed in claim 8, wherein:

the second cover member further comprises a partial wall parallel to the second cover member and connected to the end and side walls of the second cover and having an interior edge, the interior edge of the second cover member engaging the bottom main surface of the body in the opened positions of the first and second cover members and thereby supporting the body in the tilted state.

10. The equipment claimed in claim 9, wherein the pair of pivots of the second cover member comprises a pair of pins projecting inwardly, opposite to each other, and pivotiably engageable with a respective pair of pivot holds provided at free ends of the pair of guide bars.

11. The equipment claimed in claim 10, wherein on the opposite sides of the equipment body, a pair of second guide grooves is provided in parallel to the pair of guide grooves and engaged with the pair of pivots.

12. The equipment claimed in claim 2, wherein the second end of the first cover member is pivotally coupled to the first end of the second cover member by a hinge member disposed so that a pivot axis of the hinge member is parallel to the pair of pins at the first end of the first cover member and the pair of pins in the pivots of the second cover member.

13. The equipment claimed in claim 12, wherein the hinge member is a flexible film sheet.

14. The equipment claimed in claim 5, wherein the second cover member comprises a stop element which contacts the rear surface of the body in the open position of the first and second cover members.

15. An equipment having an openable cover, comprising:

a body having upper and lower main surfaces, with corresponding side edges and front and rear edges interconnected by respective side walls and front and rear end walls, the upper main surface having a display panel thereon;

a pair of guides in the pair of sidewalls, respectively extending by a first distance between first and second end positions respectively adjacent the front and rear end walls, parallel to the display and to each other;

a pair of second guides in the pair of side walls, respectively, parallel to the pair of first guides and extending by a second distance, less than the first distance, between third and fourth end positions being intermediate the first distance and the fourth end positions being adjacent the rear wall;

a first cover member having first and second ends and a second cover member having third and fourth ends, the second and third ends being pivotally coupled, opposite sides of the first cover member at the first end thereof being slidable and pivotally received in and guided by the first pair of guides, respectively for movement between the respective first and second end positions thereof, and opposite sides of the second cover member at intermediate positions between the third and fourth ends thereof being slidably and pivotally received in and guided by the second pair of guides, respectively, for movement between the respective third and fourth end positions thereof;

the first and second cover members lying in a common plane parallel to, and covering the display when pivotally coupled to the respective first and second pairs of guides in the respective first and third end positions thereof, and the first and second covers being slidably movable in the respective first and second guides from the first and third, and toward the second and fourth, respective end positions thereof, the second cover member further being rotatable, when coupled to the second guides at the respective fourth end positions thereof, about the rear end wall of the body so as to extend at an angle relatively to the upper and lower main surfaces of the body and below the bottom main surface of the body, thereby to support the body at a tilted state.

16. The housing, comprising:

a body having upper and lower main surfaces, a pair of side walls extending between corresponding side edges of the upper and lower main surfaces and a pair of side walls extending between corresponding front and rear end edges of the upper and lower main surfaces;

a bifurcated cover of first and second cover members having respective, opposite side edges and respective, opposite interior and remote end edges, the first cover member having a first pair of pivots defining a first axis of rotation and connected to the opposite side edges thereof, respectively, adjacent the remote end edge thereof and received a respectively in a first pair of guides in the pair of sidewalls of the base, the first pair of guides extending for a first distance, substantially equal to an entire length of the sidewalls, between a first position adjacent the front end wall and a second position adjacent the rear end wall of the base, the second cover member having a second pair of pivots defining a second axis of rotation and connected to the opposite side edges thereof, respectively intermediate the interior and remote end edges thereof and received respectively in the second pair of guides in the pair of sidewalls of the base, the second distance, less than the first distance, from corresponding first positions extending for a second distance, less than the first distance, from corresponding first positions intermediate the length of the sidewalls of the base to respective second positions adjacent the rear end wall of the base; and a hinge interconnecting the adjacent, interior edges of the first and second cover members and defining a third axis of pivotal rotation; and the first and second cover members being disposed in a common planar relationship in a closed condition, covering the first main surface of the base with the respective first and second pairs of pivots thereof in the first and third positions of the first and second guides and, by translation of the first and second pairs of pivots from the first from the first and third end positions, to the second and fourth end positions of the respective first and second guides and by rotation of the first and second cover members about the respective first and second axes of rotation relatively to the base and about the third axis of rotation relatively to each other, the second cover member thereby being rotated to an angular relationship relatively to the upper and lower main surfaces and extending below the lower main surface to support the base at a tilt position and the first cover member being translated, guided by the pair of first guides, and rotated relatively to the base to expose the upper main surface of the base.

17. The housing claimed in claim 16, wherein:

the pair of second guide further comprise a pair of elongated second guide grooves, respectively, in the sidewalls of the base and a corresponding pair of elongated guide bars received in the side grooves and having respective pivot holes therein adjacent free ends thereof.

18. The housing claimed in claim 17, wherein the pair of second guide grooves is provide in parallel to the pair of sidewalls, respectively, of the base and receive therein the second pair of pivots, respectively.

19. The housing claimed in claim 16, wherein the first, second and third axes are parallel to each other.

20. The housing claimed in claim 16, wherein the hinge is flexible sheet.

21. The housing claimed in claim 15, wherein the second cover member further comprises a stop element contacting the bottom surface of the body in the open position of the bifurcated cover.

22. A housing, comprising:

a body having upper and lower main surfaces, a pair of sidewalls and a pair of front and rear end walls;

a bifurcated cover of first and second cover members pivotally connected to each other and slidably and pivotally mounted to the pair of sidewalls of the body and movable from a first position, coplanar with each other and parallel to and covering the first surface of the body, to a second position, in an angular and confronting relationship with each other at the rear end wall, exposing the upper main surface of the body and with the second cover member pivoted about the rear end wall of the body and extending, in part, below the rear surface of the body to support the body at a tilt angle.

23. The housing claimed in claimed 22, further comprising:

a pair of first guides in the pair of sidewalls, respectively, extending a first distance, from adjacent the front endwall to adjacent the rear end wall of the body;

a pair of first pivotal and slidable mounts, received in the pair of first guides, respectively, and connected to respective opposite side edges of the first cover member adjacent a free end thereof;

a pair of second guides in the pair of sidewalls, respectively, extending a second distance, from intermediate the front and rear end walls of the body to adjacent the rear end wall of the body; and a pair of second pivotal and slidable mounts received in the pair of second guides, respectively, and connected to respective opposite side edges of the second cover member intermediate front and rear ends thereof.

* * * * *

UNITED STATES PATENT AND TRADEMARK OFFICE
CERTIFICATE OF CORRECTION

PATENT NO.   : 6,034,866
DATED        : March 7, 2000
INVENTOR(S)  : Atsunobu Nobuchi et al.

It is certified that error appears in the above-identified patent and that said Letters Patent is hereby corrected as shown below:

Column 7,
Line 25, after "thereof;" insert -- and --;
Line 52, change "defined by" to -- claimed in --.

Column 8,
Line 27 through column 9, line 4, delete claim 15 in its entirety.

Column 9,
Line 17, delete "a" (first occurrence);
Line 28, after "the" (second occurrence) insert -- second pair of guides being parallel to the first pair of guides, respectively, and extending for a --.

Column 10,
Line 4, change "guide" to -- guides --;
Line 10, after "therefor" insert --; and the pair of second pivots of the second cover member comprise a pair of pins projecting inwardly and opposite to each other, and pivotally engaged with the pair of pivot holes --;

UNITED STATES PATENT AND TRADEMARK OFFICE
CERTIFICATE OF CORRECTION

PATENT NO. : 6,034,866
DATED : March 7, 2000
INVENTOR(S) : Atsunobu Nobuchi et al.

It is certified that error appears in the above-identified patent and that said Letters Patent is hereby corrected as shown below:

Column 10,
Line 11, change "provide" to -- provided -;
Line 11, after "of" insert -- first guide grooves in the pair of --;
Line 18, change "claim 15" to --claim 16 --.

Signed and Sealed this

Seventh Day of August, 2001

*Attest:*

*Attesting Officer*

NICHOLAS P. GODICI
*Acting Director of the United States Patent and Trademark Office*